Nov. 4, 1952      V. A. EAST      2,616,725
CHILD'S VEHICLE
Filed March 20, 1950
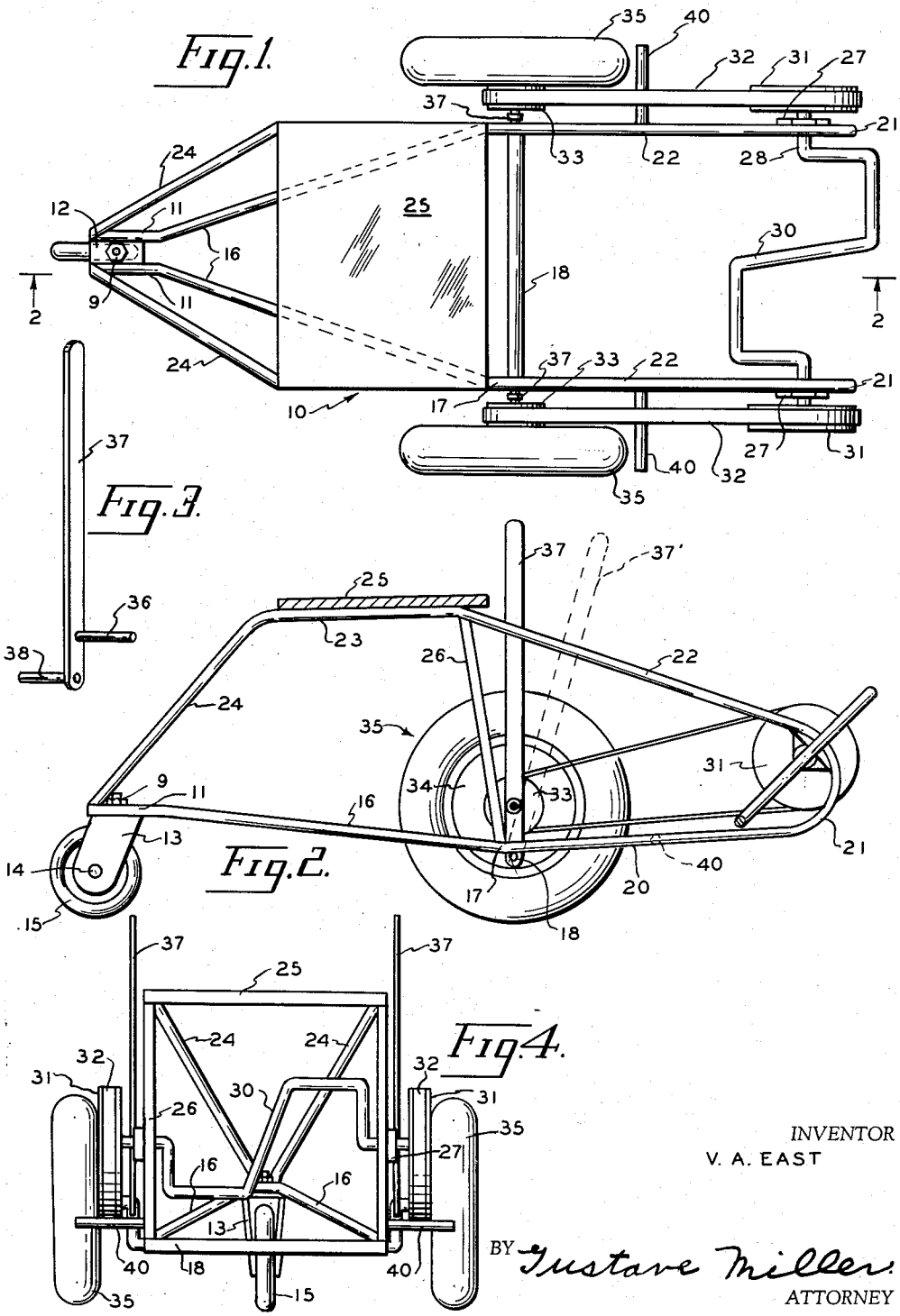
INVENTOR
V. A. EAST
BY *Gustave Miller*
ATTORNEY Patented Nov. 4, 1952

2,616,725

UNITED STATES PATENT OFFICE 2,616,725

CHILD'S VEHICLE

Vernon A. East, Malden, Mo.

Application March 20, 1950, Serial No. 150,759

7 Claims. (Cl. 280—211)

This invention relates to a child's vehicle which may be considered as being a toy tractor and has for an object to provide an improved child's vehicle which is propelled and which is steered in the manner of a tractor; that is, by selectively applying the power to either one of the propelling wheels.

A further object of this invention is to provide a three-wheeled child's vehicle, two of which wheels are selectively used individually or simultaneously as power wheels and the third wheel of which is caster-mounted.

A further object of this invention is to provide a child's vehicle which may be made of rugged construction, yet of comparatively low cost.

A further object of this invention is to provide a child's vehicle which may be operated and steered in the manner of a tractor by a very small child and which is sufficiently simple that there is very little that can get out of order.

Still a further object of this invention is to provide a child's vehicle which may be made principally of pipe or tubing and is, therefore, fairly rugged and capable of standing the usual abuse of a small child.

Still a further object of this invention is to provide an improved means of steering a pedal-propelled child's vehicle.

Yet a further object of this invention is to provide a means for steering a pedal-propelled child's vehicle wherein there is provided an individual combination drive control and brake means for each of the two propelling wheels for connecting the propelling wheels to the pedal means.

With the foregoing and other objects in view, as will hereinafter become apparent, this invention provides a construction, combination and arrangement of parts hereinafter set forth, claimed and disclosed in the accompanying drawing, wherein Fig. 1 is a top plan view of the child's vehicle of this invention;

Fig. 2 is a sectional view on line 2—2 of Fig. 1;

Fig. 3 is a perspective view of the clutch and brake lever, and

Fig. 4 is a front plan view of the vehicle.

There is shown at 10 the child's vehicle of this invention. This vehicle 10 includes a framework made principally of pipe or tubing. The framework consists of two oppositely disposed symmetrical sections of tubing shaped as shown. The framework tubing starting at the lower wheel includes an end portion 11. Secured between the frame end portions 11 is a plate 12 having a vertical aperture providing a bearing for a bolt and nut 9 acting as a journal member for an offset caster fork member 13 in which is mounted an axle 14 for the rear caster wheel 15. Extending outwardly and slightly downwardly from the caster plate holding section 11, the frame sections 16 extend outwardly from each other to the full width of the vehicle to a point 17 just before the place where a hollow housing 18 is secured therebetween. From this point frame sections 20 extend slightly upward but parallel to each other to the front of the vehicle where they turn upwardly in a smooth curve 21 and then extend back again at 22 upwardly to the desired height whereupon they extend rearwardly in parallelism in sections 23 and then downwardly at 24 to meet the rear end of sections 11. The sections 23 act as supports for a seat 25 secured thereto, which seat 25 in turn serves to properly space the sections 23 apart. A pair of upright sections 26 are provided extending from about the point where the two upper sections 22 and 23 meet to the point where the two lower sections 15 and 16 meet. While the sections 26 may consist of a separate piece welded between these two points, it could consist of a piece integral with all the other sections, and each side frame may be made from a single piece of tubing properly bent and folded somewhat like a distorted figure 8 lying on its side, in which case the bottom of section 26 could be one end of the tube which is folded to form the section 23, then folded again to form section 24, then sharply folded to form section 11, then folded again for section 16, folded again at 17 for section 20, curved for section 21, to provide section 22, the end of section 22 being welded to the fold between sections 26 and 23, while the lower end of section 26, the beginning of the tubing, is welded to the fold 17 between sections 16 and 20.

While each side frame or chassis may thus be a single folded piece, it is, of course, obvious that it could be made of any number of individual pieces welded together at the proper angles. Secured within the curved section 21 of each side frame by suitable welding is a journal bearing 27, through which extends the axially aligned ends 28 of a pedal crank 30. Mounted on each pedal crank end 28 is a V-pulley 31 about which extends a V-belt 32. The other end of the V-belt 32 passes around a smaller V-pulley 33 which is secured to the hub 34 of a propelling wheel 35. The hub 34 is journalled on a stub axle 36 of a brake and drive control lever 37 being secured thereon in any conventional or suitable manner.

This wheel stub axle 36 is located on the lever 37 a slight distance above another and oppositely extending stub shaft 38. Each stub shaft 38 extends from an opposite direction into the open end of the axle housing 18, being removably secured thereon in any convenient manner. Welded or otherwise secured to each frame section 20 and extending outwardly therefrom a very slight distance from the wheel 35 is a brake shoe 40.

While the axle 36 is located above the pivot shaft 38, it is apparent that the positions could be reversed with the axle 36 located below the pivot shaft 38. Also, while the caster wheel is shown at the rear of the vehicle, it may also be located in the front of the vehicle by merely interchanging the relative positions of the crank 30 and of the wheels 35, the seat 25 also being relocated.

In operation, the child sits on the seat 25 and operates the crank pedal 30 to propel the vehicle. As long as the brake lever 37 is in the upright position shown in full lines in Fig. 2, the V-belt 22 is kept taut and each wheel 35 is rotated at the same speed causing the vehicle to travel in a straight line. To steer the vehicle to one side or the other, the brake pedal 37 is pivoted forwardly about its stub-shaft 38 to the dotted line position shown at 37'. This has the effect of pivoting the stub-axle 36 forwardly a slight amount carrying with it the particular individual wheel mounted thereon and causing the outer circumference of that wheel to frictionally abut the brake shoe 40. This causes the rotation of that wheel to slow up or stop due to the friction between the outer surface of the wheel and the brake shoe 40 and also due to the fact that the particular V-belt 22 operating that wheel is no longer taut for the V-pulley 33 has likewise been moved forward a slight amount and the V-belt then slips readily on one or the other of the V-pulleys.

The forward movement of one lever 37 thus declutches its particular wheel from the power provided by the propelling crank 30 and simultaneously brakes the rotation of that wheel. With only one lever pushed forward, power continues to flow from the pedal or crank 30 to the wheel on the other side, thereby causing the vehicle to turn in the direction in which the brake and drive control lever has been operated. To stop the vehicle, both levers may be pushed forward simultaneously thus braking both wheels against rotation and stopping the vehicle. It is thus apparent that a tractor-like child's vehicle is provided wherein steering is done by selectively declutching and braking one or the other of the propelling wheels and stopping is done by either back-pedalling on the crank or pedal 30 or more effectively by declutching and braking both the power wheels. An important feature of this invention is the fixed brake shoe against which the wheel is moved as its axle is pivoted by means of the combination drive control and brake lever, simultaneously declutching the wheel by releasing the pressure on the power V-belt thereto. Obviously, it is immaterial whether the pivot point is above or below the axle of the wheel.

While the preferred form of this invention has been shown and described, it will be understood that this invention is not restricted to the particular details of construction and arrangement hereinbefore set forth but that changes in such detail of construction may be made within the scope of what is hereinafter claimed.

Having thus set forth and disclosed the nature of this invention, what is claimed is:

1. A child's vehicle comprising a frame, a caster wheel mounted at one end of said frame, a pedal crank journalled in said frame, a pair of propelling wheels, means for selectively operatively connecting either or both said wheels to said pedal crank, comprising a pulley secured to each of said propelling wheels, a pulley secured on each end of said pedal crank, a belt connecting said wheel pulley and said pedal crank pulley and a combination brake and drive control lever for each wheel, said lever having a stub axle on which said propelling wheel is journalled, said lever having a shaft pivotally mounted on said frame, and a brake shoe secured to said frame adjacent the rim of each propeller wheel.

2. A child's vehicle comprising a frame, a caster wheel mounted at one end of said frame, a pedal crank journalled in said frame, a pair of propelling wheels, means for selectively operatively connecting either or both said wheels to said pedal crank, comprising a pulley secured to each of said propelling wheels, a pulley secured on each end of said pedal crank, a belt connecting said wheel pulley and said pedal crank pulley and a combination brake and drive control lever for each wheel, said lever having a stub axle on which said propelling wheel is journalled, said lever having a shaft pivotally mounted on said frame, and a brake shoe secured to said frame adjacent the rim of each propeller wheel, said lever being pivotable about said pivot shaft to move said propeller wheel into contact with said brake shoe in one direction and away from the said brake shoe in an opposite direction and into driving contact with said pulley belt, whereby said vehicle may be steered by moving either lever from belt engaging position to belt releasing and brake shoe engaging position and may be braked by moving both levers simultaneously to brake shoe engaging position.

3. A child's vehicle comprising a frame, a caster wheel mounted at one end of said frame, a seat mounted on said frame, a pedal crank journalled in said frame and means for propelling said vehicle comprising a pair of propelling wheels, a pulley secured to each of said propelling wheels, a pulley secured on each end of said pedal crank, a belt connecting said wheel pulley and said pedal crank pulley, a combination brake and drive control lever for each wheel, said lever having a stub axle on which said propelling wheel is journalled, said lever having a shaft pivotally mounted on said frame, and a brake shoe secured to said frame adjacent the circumferential surface of each propeller wheel, said lever being pivotable about said pivot shaft to move said propeller wheel into contact with said brake shoe in one direction and away from the said brake shoe in an opposite direction and into driving contact with said pulley belt, whereby said vehicle may be steered by moving either lever from belt engaging position to belt releasing and brake shoe engaging position and may be braked by moving both levers simultaneously to brake shoe engaging position.

4. A child's vehicle comprising a frame, a caster wheel mounted at one end of said frame, a seat mounted on said frame, a pedal crank journalled in said frame and means for propelling and steering said vehicle comprising a pair of propelling wheels, a V-pulley secured to each of said propelling wheels, a V-pulley secured on each end of said pedal crank, a V-belt connecting said wheel V-pulley and said pedal crank V-pulley, a combination brake and drive control lever for each wheel, said lever having a stub axle on which said propelling wheel is journalled, a hollow housing extending across said frame, said lever having a shaft pivotally mounted in an end of said housing, and a brake shoe secured to said frame adjacent the circumferential surface of each propeller wheel, said lever being pivotable about said pivot shaft to move said propeller wheel into contact with said brake shoe in one direction and away from the said brake shoe in an opposite direction and into driving contact with said pulley belt, whereby said vehicle may be steered by moving either lever from belt engaging position to belt releasing and brake shoe engaging position and may be braked by moving both levers simultaneously to brake shoe engaging position.

5. A child's vehicle comprising a frame, a caster wheel mounted on said frame, a pedal crank journalled in said frame and means for propelling and steering said vehicle comprising a pair of propelling wheels, a pulley secured to each of said propelling wheels, a pulley secured on each end of said pedal crank, a belt connecting said wheel pulley and said pedal crank, and a combination brake and drive control lever for each wheel, said lever having a stub axle on which said propelling wheel is journalled, said lever having a shaft pivotally mounted on said frame, and a brake shoe secured to said frame adjacent the rim of each propeller wheel, said lever being pivotable about said pivot shaft to move said propeller wheel into contact with said brake shoe in one direction and away from the said brake shoe in an opposite direction and into driving contact with said pulley belt, whereby said vehicle may be steered by moving either lever from belt engaging position to belt releasing and brake shoe engaging position and may be braked by moving both levers simultaneously to brake shoe engaging position.

6. A child's vehicle comprising a frame, a caster wheel mounted at one end of said frame, a seat mounted on said frame, a pedal crank journalled in said frame and means for propelling said vehicle comprising a pair of propelling wheels, a pulley secured to each of said propelling wheels, a pulley secured on each end of said pedal crank, a belt connecting said wheel pulley and said pedal crank, and a combination brake and drive control lever for each wheel, said lever having a stub axle on which said propelling wheel is journalled, said lever having a shaft pivotally mounted on said frame, and a brake shoe secured to said frame adjacent the rim of each propeller wheel, said lever being pivotable about said pivot shaft to move said propeller wheel into contact with said brake shoe in one direction and away from the said brake shoe in an opposite direction and into driving contact with said pulley belt, whereby said vehicle may be steered by moving either lever from belt engaging position to belt releasing and brake shoe engaging position and may be braked by moving both levers simultaneously to brake shoe engaging position.

7. In a wheeled vehicle, a pedal crank journalled therein, a V-pulley fixed at each end of said pedal crank, a pair of propelling wheels, a V-pulley on each of the wheels, a pair of V-belts, each V-belt connecting one crank V-pulley to one wheeled V-pulley, a separate axle for each propelling wheel, a brake shoe mounted on said frame adjacent the outer circumference of each propelling wheel and means for selectively shifting the position of each propelling wheel axle to tighten said wheel V-pulley against its V-belt in one direction and loosen said V-belt in the opposite direction while simultaneously engaging the wheel circumference against said brake shoe, said shifting means comprising a pair of hand levers, means for pivotally mounting said levers on said frame, each said wheel axle being mounted on one of said hand levers.

VERNON A. EAST.

REFERENCES CITED

The following references are of record in the file of this patent:

UNITED STATES PATENTS

| Number | Name | Date |
|---|---|---|
| 97,837 | Volk | Dec. 14, 1869 |
| 581,973 | York | May 4, 1897 |
| 1,245,317 | Cashner | Nov. 6, 1917 |
| 2,289,331 | Alt | July 14, 1942 |
| 2,461,391 | Osterhaus | Feb. 8, 1949 |
| 2,557,183 | Gelles | June 19, 1951 |

FOREIGN PATENTS

| Number | Country | Date |
|---|---|---|
| 176,514 | Great Britain | Mar. 8, 1922 |